United States Patent
Sato et al.

(10) Patent No.: US 9,314,990 B2
(45) Date of Patent: Apr. 19, 2016

(54) RESIN COMPOSITE STRUCTURE AND METHOD FOR PRODUCING THE SAME

(71) Applicant: HONDA MOTOR CO., LTD., Tokyo (JP)

(72) Inventors: Keiichi Sato, Wako (JP); Daiya Yamashita, Wako (JP); Hiroshi Kato, Wako (JP); Toshiaki Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 14/202,139

(22) Filed: Mar. 10, 2014

(65) Prior Publication Data

US 2014/0272243 A1    Sep. 18, 2014

(30) Foreign Application Priority Data

Mar. 12, 2013    (JP) .................. 2013-048599

(51) Int. Cl.
*B32B 3/06* (2006.01)
*B29C 65/02* (2006.01)
(Continued)

(52) U.S. Cl.
CPC .............. *B32B 3/06* (2013.01); *B29C 65/022* (2013.01); *B29C 65/18* (2013.01); *B29C 65/20* (2013.01); *B29C 65/305* (2013.01); *B29C 65/72* (2013.01); *B29C 65/7841* (2013.01); *B29C 66/1122* (2013.01); *B29C 66/221* (2013.01); *B29C 66/223* (2013.01); *B29C 66/341* (2013.01); *B29C 66/43* (2013.01); *B29C 66/5241* (2013.01); *B29C 66/543* (2013.01); *B29C 66/63* (2013.01); *B29C 66/72143* (2013.01); *B29C 66/73921* (2013.01); *B29C 66/81427* (2013.01); *B29C 66/81431* (2013.01); *B29C 66/8322* (2013.01); *B29C 65/4815* (2013.01); *B29C 65/5014* (2013.01); *B29C 65/5042* (2013.01); *B29C 65/5071* (2013.01); *B29C 65/5078* (2013.01); *B29C 65/7832* (2013.01);
(Continued)

(58) Field of Classification Search
CPC ........ B29C 66/539; B29C 65/022; B32B 3/06
USPC ........................................ 264/249
See application file for complete search history.

(56) References Cited

FOREIGN PATENT DOCUMENTS

| JP | 09-314669 | 12/1997 |
|---|---|---|
| JP | 11090986 A  * | 4/1999 |
| JP | 2007-313778 | 12/2007 |

OTHER PUBLICATIONS

Chinese Office Action dated Dec. 28, 2015, with partial English translation, 8 pages.

*Primary Examiner* — Brent O'Hern
(74) *Attorney, Agent, or Firm* — Rankin, Hill & Clark LLP

(57) ABSTRACT

Linking parts are formed on one end of a first resin composite member and on one end of a second resin composite member in order to bond the ends together. For example, the linking parts may be wavy parts containing concave portions and convex portions. In this case, the wavy parts initially are heated and softened. Then, in a molding unit, respective pairs of confronting convex portions are overlapped with each other, and respective pairs of confronting concave portions are utilized to form a non-overlapping space. The overlapped convex portions are pressed and crushed, such that a base thermoplastic resin and fibers contained therein flow toward the non-overlapping space. Thereafter, the thermoplastic resin is cooled and hardened, whereby the first resin composite member and the second resin composite member are bonded integrally to obtain a resin composite structure.

13 Claims, 14 Drawing Sheets

(51) Int. Cl.
*B29C 65/20* (2006.01)
*B29C 65/30* (2006.01)
*B29C 65/00* (2006.01)
*B29C 65/18* (2006.01)
*B29C 65/72* (2006.01)
*B29C 65/48* (2006.01)
*B29C 65/50* (2006.01)
*B29C 65/78* (2006.01)
*B29L 31/30* (2006.01)

(52) U.S. Cl.
CPC ............ *B29C66/225* (2013.01); *B29C 66/7212* (2013.01); *B29L 2031/3055* (2013.01); *Y10T 428/18* (2015.01); *Y10T 428/192* (2015.01)

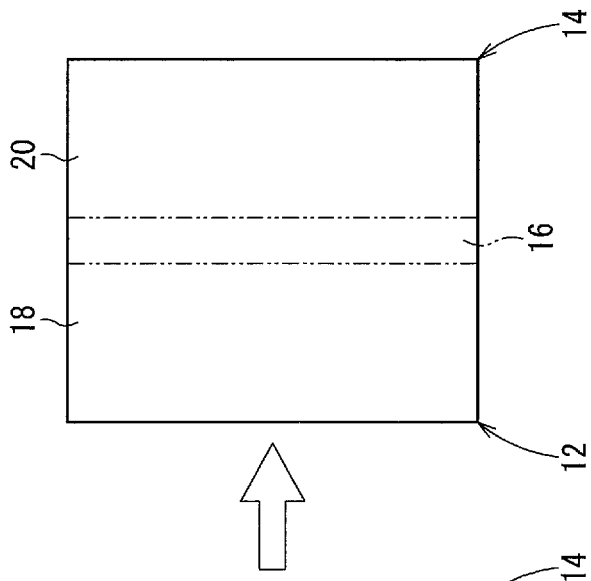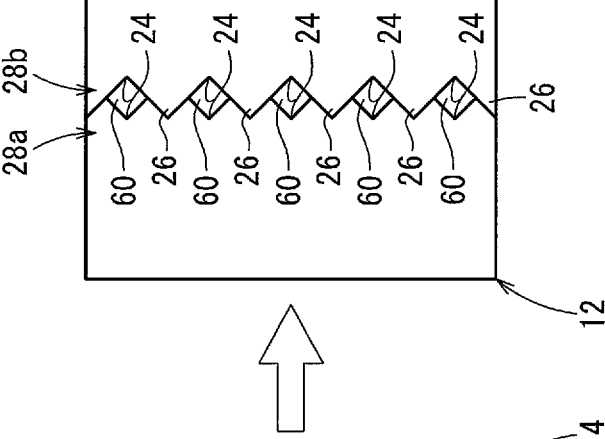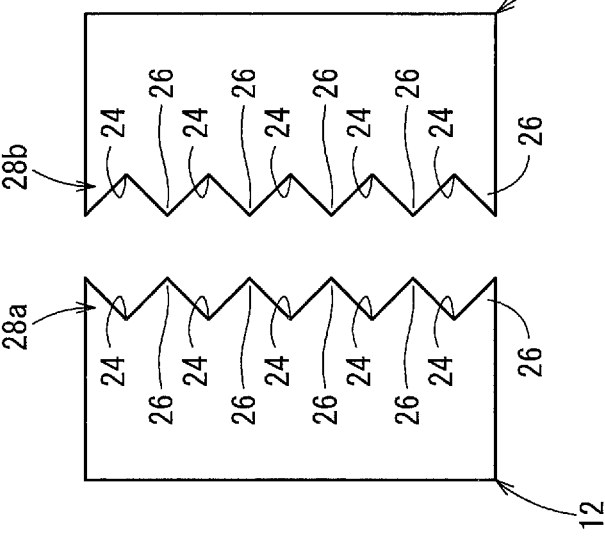

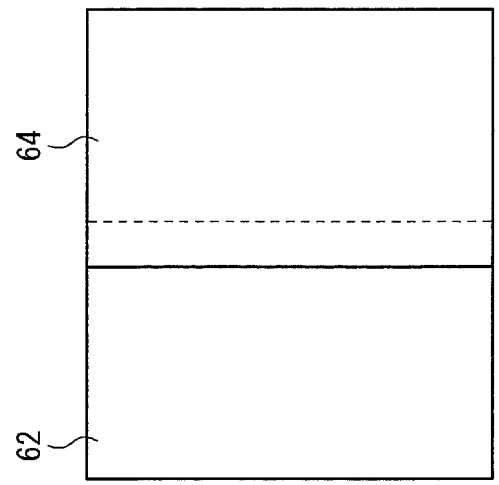
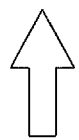
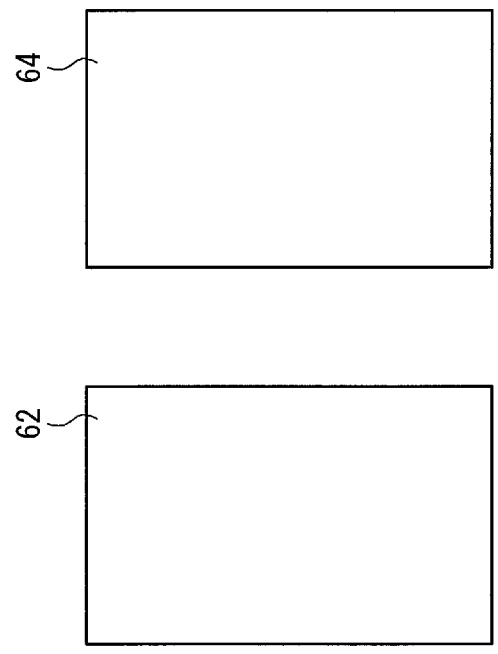

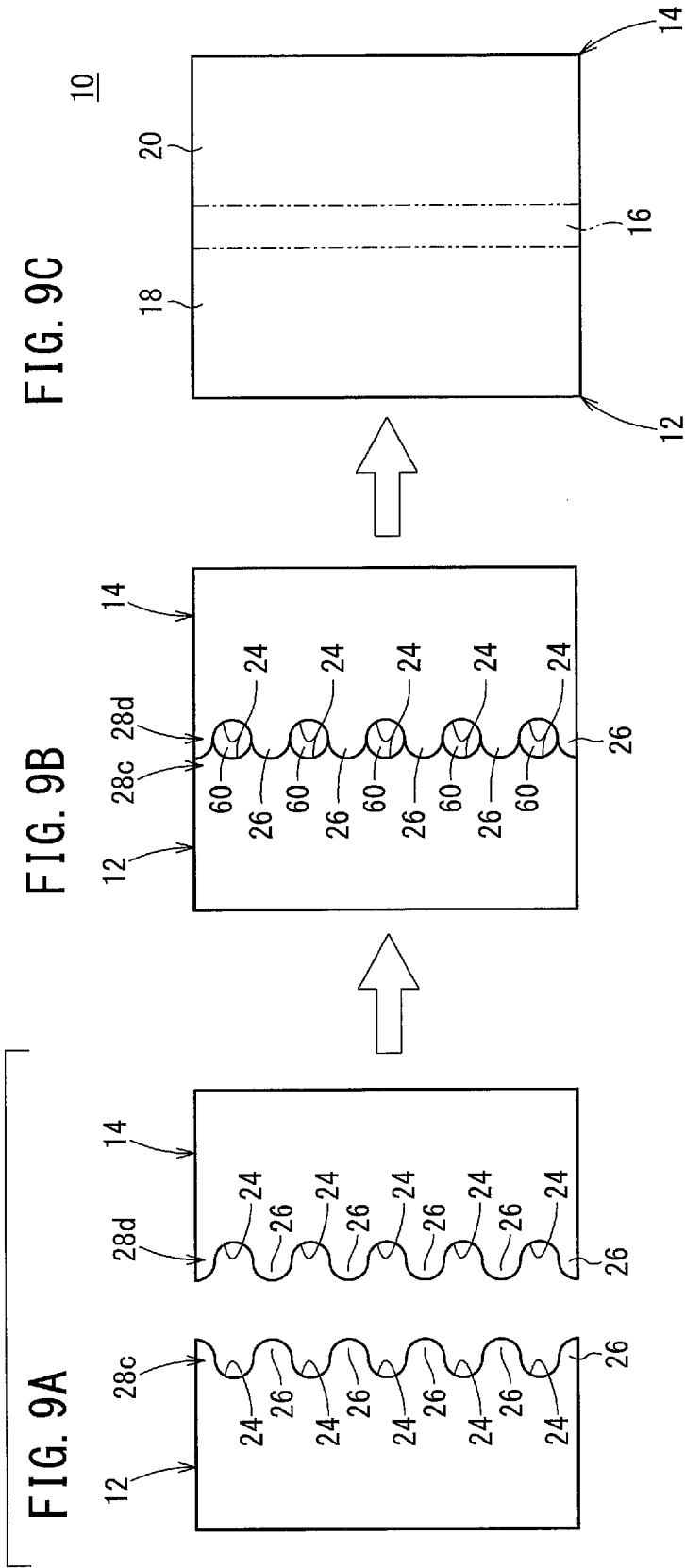

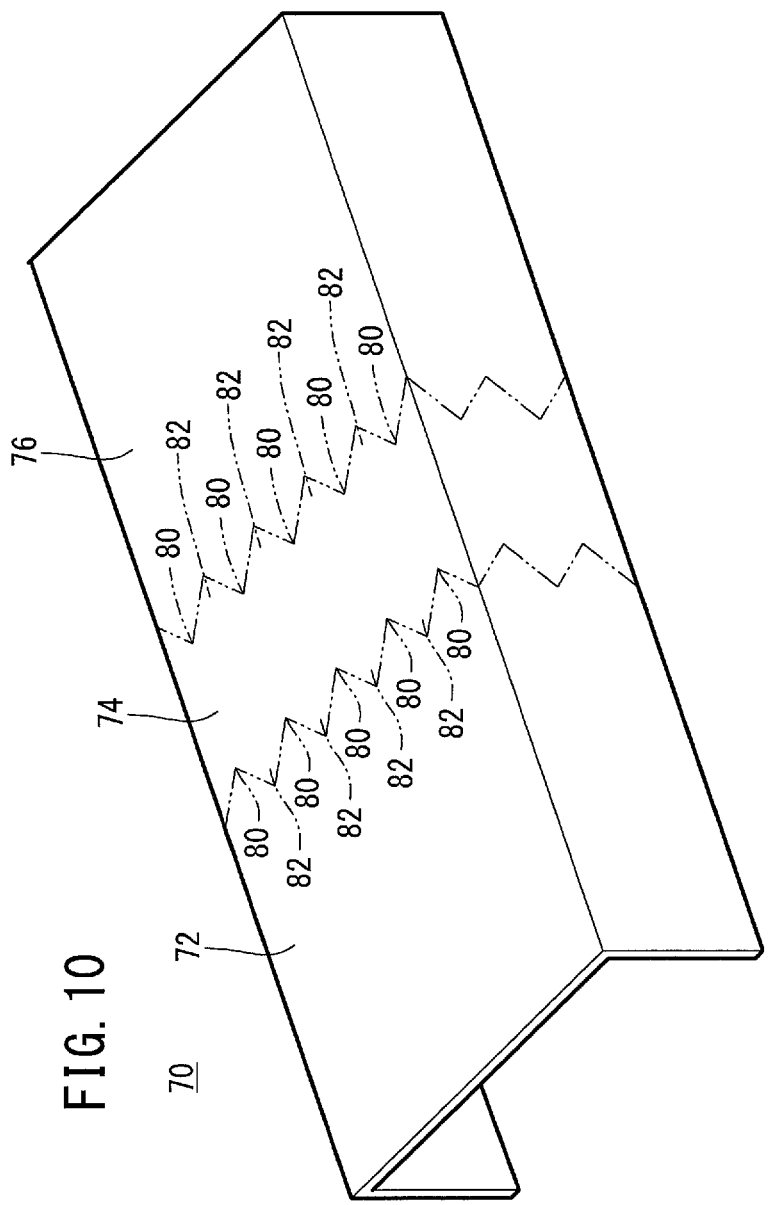

ical Laid-Open Patent Publication No. 11-090986, the members first are heated and melted such that the reinforcing fiber is partially exposed on the surface of the connection, and thereafter, the melted members are press-molded and welded. Japanese Laid-Open Patent Publication No. 11-090986 describes that the connection obtained by this welding method has an excellent appearance and exhibits a high welding strength.

RESIN COMPOSITE STRUCTURE AND METHOD FOR PRODUCING THE SAME

CROSS-REFERENCE TO RELATED APPLICATION

This application is based upon and claims the benefit of priority from Japanese Patent Application No. 2013-048599 filed on Mar. 12, 2013, the contents of which are incorporated herein by reference.

BACKGROUND OF THE INVENTION

1. Field of the Invention

The present invention relates to a resin composite structure obtained by integrally bonding fiber-reinforced thermoplastic resin composite members containing discontinuous fibers. The present invention also relates to a method for producing such a resin composite structure.

2. Description of the Related Art

A fiber-reinforced thermoplastic resin composite (hereinafter referred to simply as a resin composite) is a material containing fibers such as glass or carbon fibers impregnated with a thermoplastic resin. In recent years, such a resin composite has been studied as a material for a component of a car body (such as a floor or a monocoque component).

In general, the car body component has a large size. Therefore, in order to produce the entire component in one molding process, a large scale molding apparatus is needed to apply a large load during the molding process. Such a large scale molding apparatus is expensive and consumes a great amount of power during the molding process. Therefore, this type of molding apparatus is disadvantageous for mass production in terms of its high facility cost and high running cost.

A large component can be obtained by connecting a plurality of members that have been prepared separately. However, in the case that such separate members are connected mechanically using nuts and bolts or rivets (i.e., so-called metal fasteners), a boring operation and a fastening operation are required, thereby resulting in high operating costs. Furthermore, the weight of the component is increased due to the metal fasteners. In addition, in this case, electrolytic corrosion occurs at a contact portion between the reinforcing fibers and the metal fasteners. Further, it may be necessary to take countermeasures in response to different coefficients of thermal expansion of the materials.

The members may be connected by other known processes such as thermal welding, vibration welding, ultrasonic welding, or laser welding. However, such processes do not produce a sufficient welding strength.

In a method proposed in Japanese Laid-Open Patent Publication No. 11-090986, the members first are heated and melted such that the reinforcing fiber is partially exposed on the surface of the connection, and thereafter, the melted members are press-molded and welded. Japanese Laid-Open Patent Publication No. 11-090986 describes that the connection obtained by this welding method has an excellent appearance and exhibits a high welding strength.

SUMMARY OF THE INVENTION

As made clear from FIGS. 1, 4 and 5 of Japanese Laid-Open Patent Publication No. 11-090986, it is necessary to form a step structure on each member that is connected according to the above-described welding method. Therefore, the resultant component cannot have a flat shape. Even if the component is not required to have a flat shape, the connection between the members inevitably has a large thickness and thus is increased in weight.

Furthermore, the connection obtained by the above welding method is not sufficient in welding strength.

A general object of the present invention is to provide a resin composite structure that is light in weight, and which possesses a sufficient bonding strength and a sufficient stiffness.

A principal object of the present invention is to provide a large integrated resin composite structure that can have a flat connection if necessary.

Another object of the present invention is to provide a method for producing the resin composite structure.

According to an aspect of the present invention, a resin composite structure is provided comprising a first resin composite member and a second resin composite member both containing discontinuous fibers. The first resin composite member and the second resin composite member are bonded integrally to each other, and the discontinuous fibers are oriented randomly in a connection formed between the first resin composite member and the second resin composite member.

As a result of intense research, the inventor has discovered that in conventional resin composite structures, discontinuous fibers are not intertwined randomly in the connection between the resin composite members. Therefore, a connecting force derived solely from resin welding acts on the connection.

In contrast, in the resin composite structure of the present invention, the discontinuous fibers are oriented randomly and intertwined in the connection that is formed between the first and second resin composite members. Consequently, the base thermoplastic resins in the members are welded and bonded, and the discontinuous fibers are intertwined, whereby the resultant connection exhibits excellent strength and stiffness.

An additional third resin composite member containing the discontinuous fibers may be bonded integrally to the second resin composite member. It is to be understood that the discontinuous fibers also are oriented randomly and intertwined in the connection between the second resin composite member and the third resin composite member. Therefore, the connection between the second and third resin composite members also exhibits excellent strength and stiffness.

The connections may have a flat surface shape. The reasons that enable the flat surface connection to be formed and the discontinuous fibers to be randomly intertwined in the connection will be described hereinafter.

According to another aspect of the present invention, a method is provided for producing a resin composite structure by bonding a first resin composite member and a second resin composite member both containing discontinuous fibers. The method comprises:

an overlapping step of forming a linking part and a non-overlapping space, which is a portion other than the linking part, between an end of the first resin composite member and an end of the second resin composite member, the ends being linked by the linking part, a bonding step of applying a load to the linking part and the ends, so as to fill the non-overlapping space and integrally bond the linking part and the ends, thereby producing the resin composite structure having a connection, wherein the discontinuous fibers are oriented randomly in the connection, and a heating step of thermally softening at least the linking part, before the overlapping step, after the overlapping step, or during the bonding step.

In the present invention, the linking part is overlapped with the resin composite member so as to become integrally bonded (forming the opposite material), whereas the portion other than the linking part is not overlapped with and is separate from the opposite material so as to form the non-overlapping space, and thereafter, the linking part and the opposite material are pressed (subjected to a load). Since the linking part is heated and softened before or during the pressing process, the thermoplastic resin and the discontinuous fibers in the linking part flow into the non-overlapping space during the pressing process. Thereafter, the linking part and the opposite material are cooled and hardened, whereby the linking part and the opposite material are bonded and integrated.

The discontinuous fibers are oriented randomly due to the above-described flowage in the connection, so that the discontinuous fibers are randomly intertwined with each other. Thus, the base thermoplastic resins in the members are welded and bonded and the discontinuous fibers become intertwined, whereby the resin composite structure forms a connection with excellent strength and stiffness.

The linking part may be formed on at least one of the first resin composite member and the second resin composite member. Of course, linking parts may also be formed on both of the first resin composite member and the second resin composite member. In this case, the linking parts may be overlapped with each other.

At least one additional resin composite member containing discontinuous fibers may be used as the linking part. In this case, the first resin composite member and the second resin composite member may be separated from each other, and the additional resin composite member (the linking part) may be overlapped with both of the first and second resin composite members, such that the first and second resin composite members are linked by the additional resin composite member.

Preferably, the ratio of the area of an overlapping portion in the linking part to the area of the non-overlapping space is 0.75 to 2.

When the above area ratio is at least 0.75 but less than 1, the connection can exhibit sufficient strength and stiffness while being thinner than the first resin composite member and the second resin composite member. Thus, the connection can be formed as a depression. On the other hand, when the above area ratio is greater than 1 but at most 2, the strength and stiffness of the connection can be further improved, and the connection can be formed as a protrusion.

In the case that the connection is formed as a depression or a protrusion as described above, the depression or the protrusion may be utilized in a design shape. Thus, the depression or the protrusion of the connection may be utilized to obtain a resin composite product having an excellent appearance including a depression or a protrusion.

When the above area ratio (i.e. the ratio of the area of the overlapping portion in the linking part to the area of the non-overlapping space) is 1, the thermoplastic resin and the discontinuous fibers in the overlapping portion in the linking part are transferred in totality into the non-overlapping space, so that the connection forms a flat surface. Thus, the connection can be formed as a flat surface part.

As described above, by appropriately controlling the above area ratio, the connection can be formed as a depression, a flat surface part, or a protrusion.

An additional third resin composite member containing discontinuous fibers may be bonded integrally to the second resin composite member in the resin composite structure.

In this case, the method further comprises:

a second overlapping step of forming a second linking part and a second non-overlapping space, which is a portion other than the second linking part, between an end of the second resin composite member and an end of a third resin composite member that contains discontinuous fibers, the ends being linked by the second linking part;

a second bonding step of applying a load to the second linking part and to the ends of the second and third resin composite members, so as to fill the second non-overlapping space and integrally bond the second linking part and the ends of the second and third resin composite members, thereby producing the resin composite structure having a second connection, the discontinuous fibers being oriented randomly in the second connection, and a second heating step of thermally softening at least the second linking part, before the second overlapping step, after the second overlapping step, or during the second bonding step.

The bonding step of integrally bonding the first and second resin composite members and the second bonding step of integrally bonding the second and third resin composite members may be performed simultaneously. In addition, the step of forming the linking part and the step of forming the second linking part may be performed simultaneously. In this case, the resin composite structure can be produced efficiently.

Of course, the bonding step and the second bonding step may be performed separately, for example, to produce a resin composite structure with a large size.

The above and other objects, features and advantages of the present invention will become more apparent from the following description when taken in conjunction with the accompanying drawings in which preferred embodiments of the present invention is shown by way of illustrative example.

BRIEF DESCRIPTION OF THE DRAWINGS

FIGS. 3A to 3C are schematic process-flow diagrams of an example of producing the resin composite structure from a first resin composite member having a wavy part and a second resin composite member having a wavy part;

FIGS. 8A and 8B are schematic process-flow diagrams of an example of producing a resin composite structure from a first resin composite member and a second resin composite member that do not have wavy parts;

FIGS. 9A to 9C are schematic process-flow diagrams of an example of producing the resin composite structure from a first resin composite member having another wavy part and a second resin composite member having another wavy part;

FIG. 10 is an overall schematic perspective view of a resin composite structure according to a second embodiment of the present invention;

DESCRIPTION OF THE PREFERRED EMBODIMENTS

Several preferred embodiments of the resin composite structure, and a production method of the present invention will be described in detail below with reference to the accompanying drawings.

Figure 1:
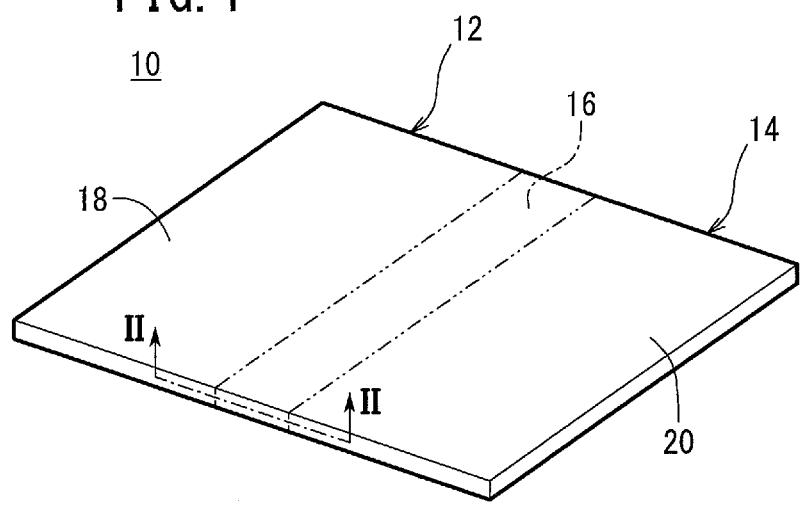
FIG. 1 is an overall schematic perspective view of a resin composite structure according to a first embodiment of the present invention.

FIG. 1 is an overall schematic perspective view of a resin composite structure 10 according to a first embodiment of the present invention. The resin composite structure 10 has a substantially flat plate-like shape containing a first resin composite member 12 and a second resin composite member 14. An end of the first resin composite member 12 is bonded to and integrated with an end of the second resin composite member 14, and thus, the resin composite structure 10 has a connection 16.

The first resin composite member 12 is composed of a fiber-reinforced resin material. The fiber-reinforced resin material contains a base thermoplastic resin, and discontinuous fibers (chopped fibers) that are dispersed randomly in the thermoplastic resin. The second resin composite member 14 is composed of the same material. The discontinuous fibers may be selected from glass fibers and carbon fibers, and preferably are carbon fibers, which exhibit excellent heat resistance, strength, and stiffness.

The connection 16 is formed by heating and pressing and thereby integrally bonding to each other the ends of the first resin composite member 12 and the second resin composite member 14, as will be described hereinafter. For purposes of illustration, a part of the first resin composite member 12 other than the connection 16 will hereinafter be referred to as a "first part 18", and a part of the second resin composite member 14 other than the connection 16 will hereinafter be referred to as a "second part 20".

Figure 2:
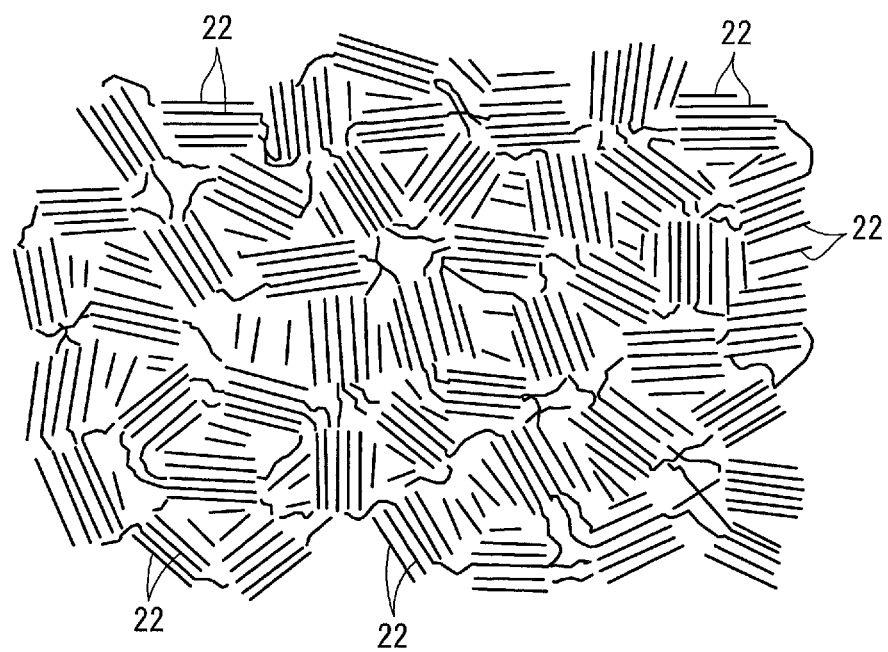
FIG. 2 is a schematic horizontal cross-sectional view of a connection in the resin composite structure, taken along the arrow II-II shown in FIG. 1.

FIG. 2 is a cross-sectional view taken along the arrow II-II shown in FIG. 1, or in other words, is a schematic view of a horizontal cross section of the connection 16. As described below, in the case that ends of the resin composite members are simply heated and pressed, the discontinuous fibers therein do not become intertwined randomly with each other in the resultant connection between the members. In contrast, as shown in FIG. 2, the discontinuous fibers 22 are oriented randomly in the connection 16 of the resin composite structure 10. In other words, the discontinuous fibers 22 are randomly intertwined with each other in the connection 16. The reasons for this feature of the invention will be described hereinafter.

In the present embodiment, the resin composite structure 10 has flat surfaces. The first part 18, the connection 16, and the second part 20 are arranged in a single plane, such that visible uneven portions are not formed between the first part 18 and the connection 16, or between the connection 16 and the second part 20.

In addition, clear boundaries are not formed between the first part 18 and the connection 16, or between the connection 16 and the second part 20. Thus, the resin composite structure 10 has a so-called seamless structure. Incidentally, in FIG. 1, the connection 16 (i.e., each bonded end thereof) is shown by imaginary lines, so as to clarify the position of the connection 16.

Thus, although the resin composite structure 10 is produced by integrally bonding the two resin composite members 12, 14, uneven portions are not formed therein. Therefore, the resin composite structure 10 can be used in a component having a desired flat surface appearance. Furthermore, an increase in thickness of the connection 16 can be prevented.

Since the discontinuous fibers 22 in the connection 16 are intertwined with each other (see FIG. 2), the connection 16 exhibits sufficient bonding strength and stiffness. Therefore, the first resin composite member 12 and the second resin composite member 14 can be prevented from becoming separated from the connection 16.

Consequently, the resin composite structure 10 of the first embodiment is excellent in appearance, bonding strength, and stiffness. A plurality of such resin composite structures 10, 10 can be bonded integrally to each other in order to produce a large component. It will be understood that such a component also is excellent in appearance, bonding strength, and stiffness. The component can be used in a car body or the like.

The resin composite structure 10 of the first embodiment can be produced in the following manner.

Initially, the first resin composite member 12 and the second resin composite member 14 are prepared. During this step, the first resin composite member 12 and the second resin composite member 14 each is of a simple flat plate-like shape.

The ends of the first resin composite member 12 and the second resin composite member 14 are subjected to a cutting process in order to form wavy parts 28a, 28b containing concave portions 24 and convex portions 26 (linking parts) thereon, as shown in FIG. 3A. The wavy parts 28a, 28b have the same phase. In the present embodiment, the convex portions 26 each have a substantially isosceles triangle-shaped protrusion having a vertex angle of substantially 90°. Therefore, the wavy parts 28a, 28b are tooth-shaped in profile.

The ends having the wavy parts 28a, 28b are heated and pressed. The heating step and the pressing step may be performed simultaneously or separately. Heating and pressing steps, which are performed separately, will be described in detail below.

Figure 4:
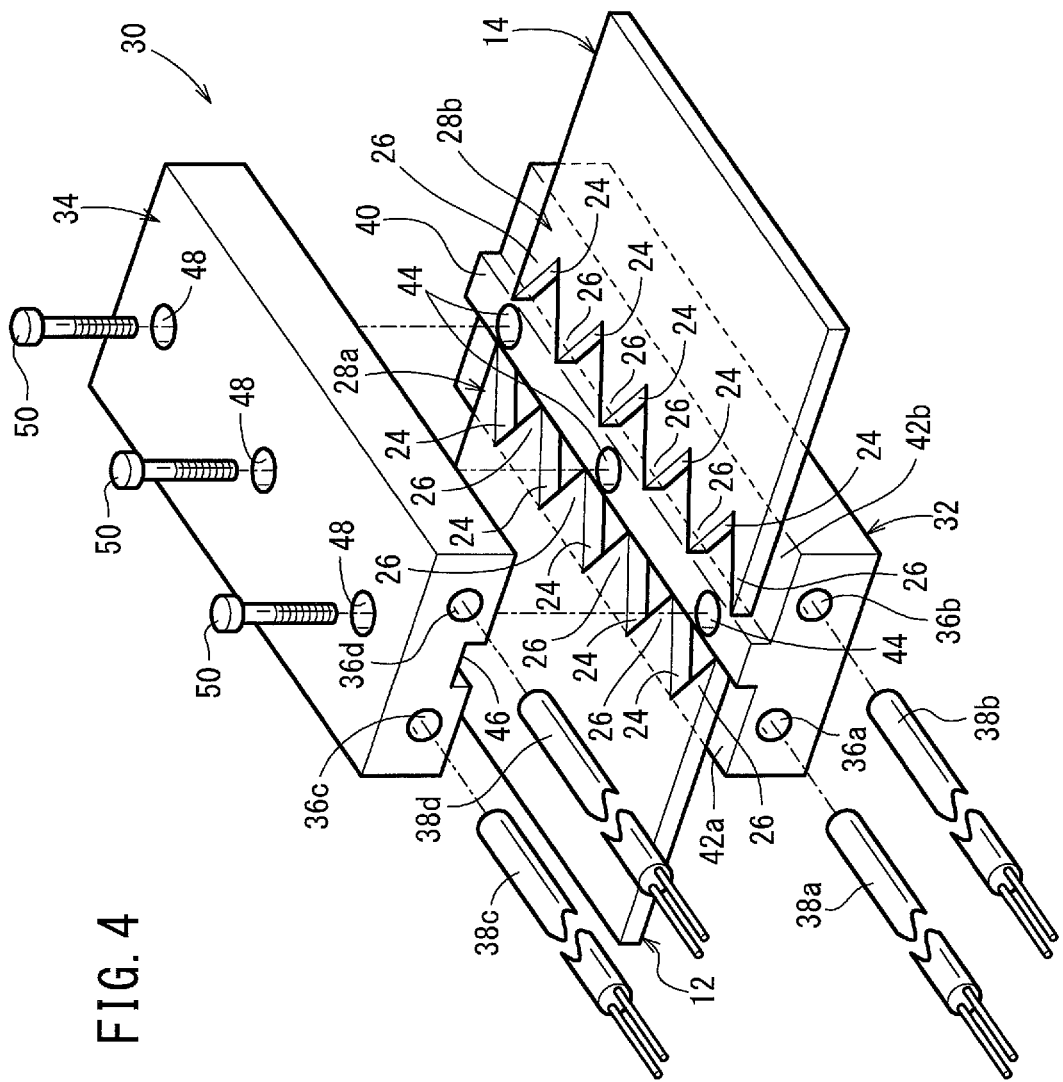
FIG. 4 is a schematic exploded perspective view of a heating apparatus for heating the wavy parts.

For example, a heating apparatus 30 shown in FIG. 4 may be used for heating the wavy parts 28a, 28b. The heating apparatus 30 will be described schematically below.

The heating apparatus 30 contains a lower support block 32 and an upper support block 34. The lower support block 32 has two insert holes 36a, 36b therein, which extend in the longitudinal direction. Rod heaters 38a, 38b, which are electrically connected to a non-illustrated control circuit, are inserted into the insert holes 36a, 36b.

On the upper surface of the lower support block 32, approximately at the center thereof in the widthwise direction, a long fitting protrusion 40 protrudes toward the upper support block 34 and extends in the longitudinal direction. Consequently, on the upper surface of the lower support block 32, a first flat surface 42a and a second flat surface 42b are formed on either side of the fitting protrusion 40. In addition, plural bolt stop holes 44 are formed on the upper surface of the fitting protrusion 40.

On the upper support block 34, a fitting groove 46 is formed in a position corresponding to the fitting protrusion 40. The fitting protrusion 40 is fitted into the fitting groove 46 when the upper support block 34 is stacked on the lower support block 32.

The upper support block 34 includes insert holes 36c, 36d, which are formed vertically above the insert holes 36a, 36b. Rod heaters 38c, 38d are inserted respectively into the insert holes 36c, 36d.

A plurality of bolt through holes 48 are formed in the upper support block 34, and extend from the upper surface of the upper support block 34 to the ceiling surface of the fitting groove 46. Bolts 50 are inserted into the bolt through holes 48 and screwed into the bolt stop holes 44.

The wavy parts 28a, 28b are heated in the following manner using the above heating apparatus 30.

First, the wavy part 28a of the first resin composite member 12 and the wavy part 28b of the second resin composite member 14 are placed on the first flat surface 42a and the second flat surface 42b, respectively.

The upper support block 34 is stacked on the lower support block 32 such that the fitting protrusion 40 is fitted into the fitting groove 46. The bolts 50 are inserted into the bolt through holes 48 and screwed into the bolt stop holes 44, so as to connect the lower support block 32 and the upper support block 34. As a result, the end (containing the wavy part 28a) of the first resin composite member 12 and the end (containing the wavy part 28b) of the second resin composite member 14 are sandwiched between the lower support block 32 and the upper support block 34. Thereafter, the rod heaters 38a to 38d are inserted respectively into the insert holes 36a to 36d.

When the heating apparatus 30 is in the aforementioned state, electric power is applied by the control circuit to the rod heaters 38a to 38d. The rod heaters 38a to 38d are heated, and thus the end (wavy part 28a) of the first resin composite member 12 and the end (wavy part 28b) of the second resin composite member 14, which are sandwiched between the lower support block 32 and the upper support block 34, are heated. As a result, the ends containing the wavy parts 28a, 28b are softened.

Figure 5:
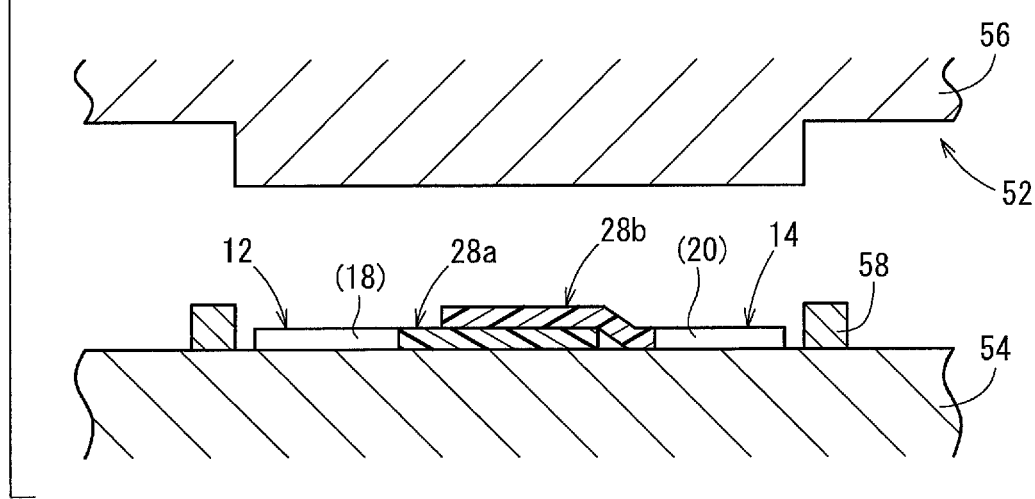
FIG. 5 is a schematic side view of the wavy parts, which overlap each other in a molding unit.

The first resin composite member 12 and the second resin composite member 14 are transferred to a molding apparatus, such as a molding unit 52 shown in FIG. 5.

The molding unit 52 contains a lower mold 54 and an upper mold 56. The lower mold 54 is a stationary mold, and the upper mold 56 can be moved closer to and farther away from the lower mold 54 by an elevating mechanism (not shown). A substantially rectangular frame 58 is positioned and fixed on the lower mold 54. The first resin composite member 12 and the second resin composite member 14 are placed inside the frame 58, and the heated ends are overlapped with each other. Incidentally, the heated ends (heated parts) are shown by hatching in FIG. 5.

During this step, as shown in FIG. 3B, the convex portions 26, 26 in the wavy parts 28a, 28b are overlapped with each other, so that a non-overlapping space 60 is formed between each pair of concave portions 24, 24 that face one another.

Figure 6:
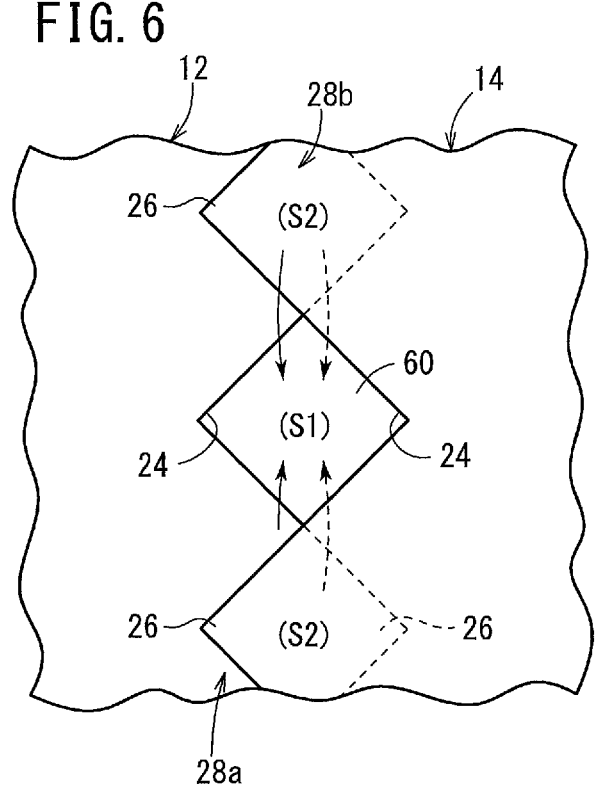
FIG. 6 is an enlarged top plan view of a principal part of the overlapping portion.

FIG. 6 is an enlarged schematic view of the non-overlapping space 60 and regions in the vicinity thereof. In this case, the non-overlapping space 60 has a substantially rhombic shape. In the first embodiment, the convex portions 26, 26 are overlapped such that the area S1 of the non-overlapping space 60 is equal to the area S2 of the overlapping portion of the convex portions 26, 26. Thus, the areas S1 and S2 satisfy the condition S2/S1=1.

As shown in FIG. 5, when the heated part of the second resin composite member 14 is stacked on the heated part of the first resin composite member 12, the unheated part of the second resin composite member 14 is brought into contact with the lower mold 54. The heated part (end) of the second resin composite member 14 is softened, and the second resin composite member 14 is readily bent at the heated part.

Figure 7:
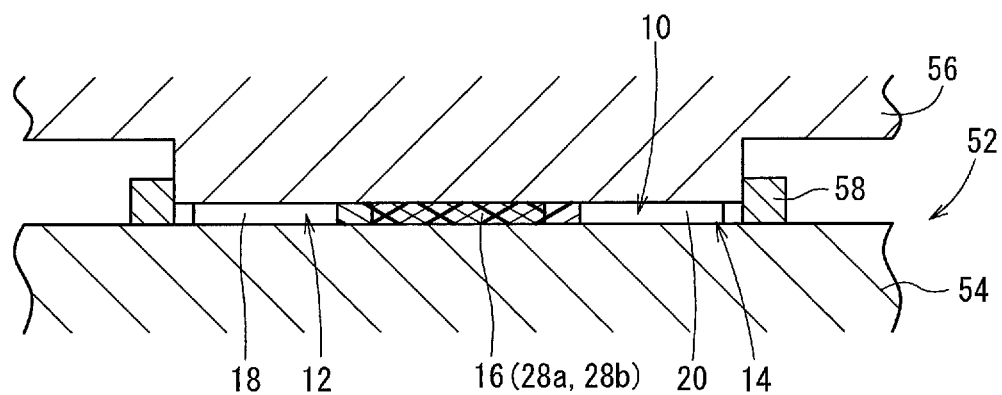
FIG. 7 is a schematic side view of an upper mold, which is lowered from the position shown in FIG. 5.

As shown in FIG. 7, the elevating mechanism is actuated in order to lower the upper mold 56. The overlapping ends (heated parts) are pressed and crushed against each other, thereby becoming integrated with each other and forming the connection 16. Incidentally, the lines shown in hatching in FIG. 7 do not represent a cross-section, but rather, indicate the heated parts, in the same manner as in FIG. 5. The hatched lines are overlapped in the ends, which are mixed (and integrated) by pressing and crushing.

During the pressing and crushing process, the base material (thermoplastic resin) in the overlapped convex portions 26 flows in the directions of the arrows shown in FIG. 6. Therefore, the non-overlapping space 60 is filled with the base material and the discontinuous fibers 22, whereby differences in level of the overlapped convex portions 26, 26 are eliminated. Thus, the connection 16 is formed as a flat surface part. In the event that the first resin composite member 12 and the second resin composite member 14 are expanded during this step, the ends of the first resin composite member 12 and the second resin composite member 14 are stopped by the frame 58.

The connection 16 is cooled and hardened in order to produce the resin composite structure 10. As shown in FIGS. 1 and 3C, the resin composite structure 10 contains the first part 18 (mainly corresponding to the unheated part of the first resin composite member 12), the connection 16, and the second part 20 (mainly corresponding to the unheated part of the second resin composite member 14). The resin composite structure 10 has a flat surface. In addition, uneven portions and clear boundaries are not formed on the first part 18, the connection 16, or the second part 20.

When the heated parts are overlapped with each other and pressed and crushed against each other, the base material and the discontinuous fibers 22 flow in the above-described manner (see FIG. 6). In the connection 16, due to such flowage, the discontinuous fibers 22 become randomly intertwined with each other. Consequently, the connection 16 exhibits excellent strength and stiffness.

As shown in FIGS. 8A and 8B, in the case that a first resin composite member 62 and a second resin composite member 64 are formed, each of which has a flat plate-like shape without the wavy parts 28a, 28b, then when an end of the first resin composite member 62 and an end of the second resin composite member 64 are heated, overlapped, and pressed and crushed against each other, the discontinuous fibers 22 do not become randomly intertwined in the connection between the members. This may be due to the fact that, during the step of pressing the overlapped ends, the base material and the discontinuous fibers 22 do not flow in the aforementioned manner. Thus, the connection cannot exhibit superior strength and stiffness compared with connections obtained by conventional resin welding.

As described above, the resin composite structure 10, in which the connection 16 exhibits sufficient strength and stiffness, can be produced by forming the wavy parts 28a, 28b at the ends, followed by overlapping and integrally bonding the wavy parts 28a, 28b.

Although according to the first embodiment, the wavy parts 28a, 28b have a tooth-like shape, the wavy parts are not limited thereto. For example, as shown in FIGS. 9A to 9C, wavy parts 28c, 28d, each of which has a sine-wave shape, may be formed. Further, in this case, the non-overlapping space 60 is filled and the discontinuous fibers 22 are oriented randomly in the connection 16, in the same manner as shown in FIGS. 3A to 3C.

Although according to the first embodiment, wavy parts 28a, 28b, 28c, 28d are formed on each of the ends, a wavy part may be formed on at least one of the ends to be overlapped. The shape of the resin composite member, which is subjected to bonding, is not limited to a flat plate-like shape, as described above, but may be a three-dimensional shape. A second embodiment using such a three-dimensional shape will be described below.

FIG. 10 is an overall schematic perspective view of a resin composite structure 70 according to the second embodiment. As shown in FIG. 10, the resin composite structure 70 is C-shaped in cross-section with an opening thereof facing downward. The resin composite structure 70 contains a long first resin composite member 72, a short second resin composite member 74, and a long third resin composite member 76, which are arranged and integrally bonded in this order in the longitudinal direction. Uneven portions and clear boundaries are not formed between the first resin composite member 72 and the second resin composite member 74, or between the second resin composite member 74 and the third resin composite member 76. Further, in the present embodiment, the resin composite structure 70 has seamless flat surfaces. Incidentally, in FIG. 10, the second resin composite member 74 is shown by imaginary lines in order to clarify the position thereof prior to bonding.

Figure 11:
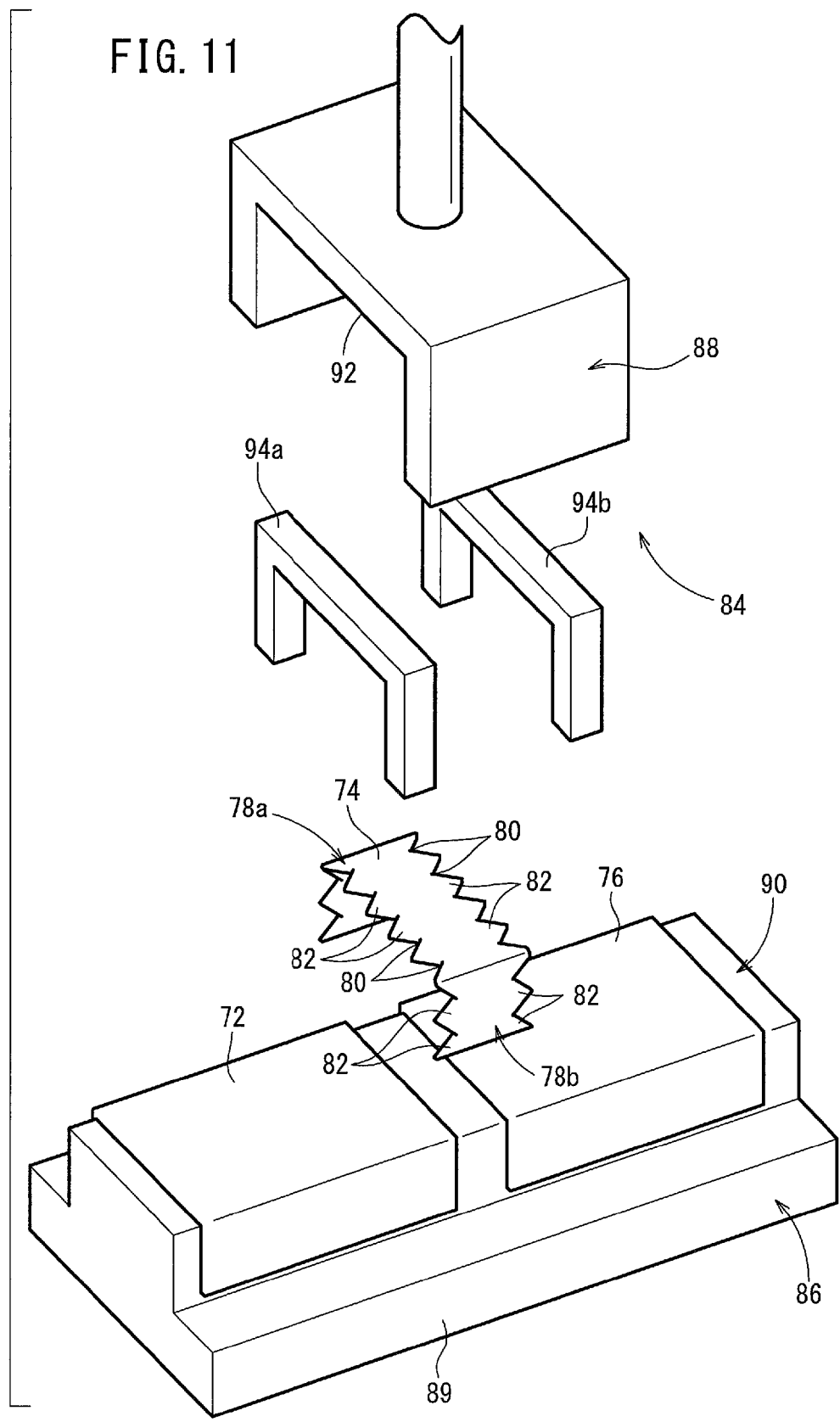
FIG. 11 is a schematic exploded perspective view of heated wavy parts of a second resin composite member, which are overlapped with ends of a first resin composite member and a third resin composite member in a molding unit for producing the resin composite structure of FIG. 10.

In the second embodiment, wavy parts 78a, 78b are formed on the ends of the second resin composite member 74, whereas the ends of the first resin composite member 72 and the third resin composite member 76 each have a straight-line shape (see FIG. 11). The wavy parts 78a, 78b are placed on the straight-line ends, and then are pressed and crushed to form connections. This process will be described hereinafter.

In the second embodiment, similar to the case of the first embodiment, the first resin composite member 72, the second resin composite member 74, and the third resin composite member 76 are composed of a fiber-reinforced resin material. The fiber-reinforced resin material contains the base thermoplastic resin and the discontinuous fibers 22 (see FIG. 2), and the discontinuous fibers 22 are randomly dispersed in the thermoplastic resin. The discontinuous fibers 22 may be selected from glass fibers and carbon fibers, and preferably, are carbon fibers.

Further, as shown in FIG. 2, in the connections of the resin composite structure 70, the discontinuous fibers 22 are oriented randomly and thus intertwined with each other. Therefore, in the second embodiment, as in the first embodiment, the connections are superior in strength.

A method for producing the resin composite structure 70 will be described below.

As shown in FIG. 11, according to the second embodiment, the first resin composite member 72 and the third resin composite member 76 are elongate members, which are C-shaped in cross-section prior to bonding. As described above, wavy parts are not formed on the first resin composite member 72 and the third resin composite member 76.

Before the heating step, the second resin composite member 74 has a substantially flat plate-like shape, and the wavy parts 78a, 78b, which contain concave portions 80 and convex portions 82, are formed on both ends of the second resin composite member 74. The second resin composite member 74 having such a shape can be prepared by cutting both ends of a flat plate, so that the second resin composite member is shorter than the first resin composite member 72 and the third resin composite member 76.

The first resin composite member 72 and the third resin composite member 76 are placed in a molding apparatus, such as a molding unit 84 shown in FIG. 11.

The molding unit 84 will be described schematically below. The molding unit 84 contains a lower mold 86 and an upper mold 88. The lower mold 86 is a stationary mold, and the upper mold 88 can be moved closer to and farther away from the lower mold 86 by an elevating mechanism (not shown). The lower mold 86 is a so-called male mold having a base 89 and a support protrusion 90. The upper mold 88 is a so-called female mold having an insert depression 92 into which the support protrusion 90 is introduced. A pressing mold (not shown), which can be raised and lowered independently from the upper mold 88, is disposed in the insert depression 92. The molding unit 84 further contains stoppers 94a, 94b that are C-shaped in cross-section.

The first resin composite member 72 and the third resin composite member 76 are placed on the support protrusion 90 of the lower mold 86. Thus, the support protrusion 90 is covered by the first resin composite member 72 and the third resin composite member 76. Meanwhile, the entire second resin composite member 74 including the wavy parts 78a, 78b is heated by a heating furnace or the like. Accordingly, the heated second resin composite member 74 is softened. Therefore, when the softened second resin composite member 74 is placed on the upper surface of the support protrusion 90 such that the wavy parts 78a, 78b overlap with ends of the first resin composite member 72 and the third resin composite member 76, a portion of the second resin composite member 74, which protrudes outside of the upper surface, is readily bent along the vertical wall of the support protrusion 90. In FIG. 11, the bent second resin composite member 74 is shown separately from the first resin composite member 72 and the third resin composite member 76.

Figure 12:
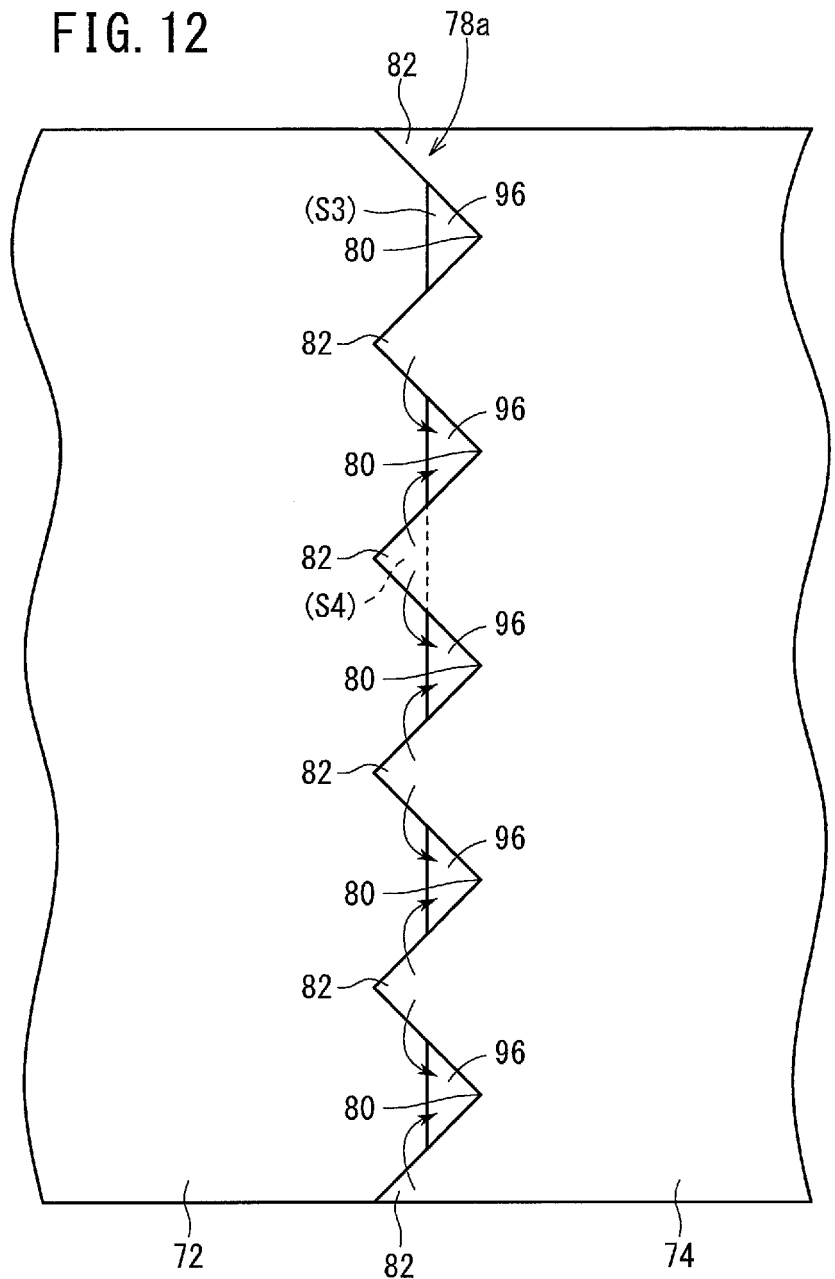
FIG. 12 is a schematic side view of the wavy part of the second resin composite member, which is overlapped with the end of the first resin composite member.

As shown in FIG. 12, the convex portions 82 in the wavy parts 78a, 78b of the second resin composite member 74 are overlapped with the ends of the first resin composite member 72 and the third resin composite member 76, so that a non-overlapping space 96 is formed between the end of the first resin composite member 72 and each of the concave portions 80 in the wavy part 78a. The area S3 of the non-overlapping space 96 is equal to the area S4 of the overlapping portion of the convex portion 82 and the end of the first resin composite member 72. Thus, the areas S3 and S4 satisfy the condition S4/S3=1. The stoppers 94a, 94b are placed in desired positions on the upper surface of the first resin composite member 72 and the upper surface of the third resin composite member 76.

Although not shown in the drawings, a non-overlapping space 96 also is formed between the end of the third resin composite member 76 and each of the concave portions 80 in the wavy part 78b of the second resin composite member 74. The area of the non-overlapping space 96 is equal to the area of the overlapping portion of the convex portion 82 in the wavy part 78b and the end of the third resin composite member 76.

Next, the upper mold 88 (see FIG. 11) is lowered by the elevating mechanism toward the lower mold 86, such that the support protrusion 90 is introduced into the insert depression 92. When the upper mold 88 reaches its lowermost position, the pressing mold disposed in the insert depression 92 is lowered in order to press the region from the overlapping portions of the wavy part 78a and the end of the first resin composite member 72 toward the overlapping portions of the wavy part 78b and the end of the third resin composite member 76. The overlapping portions are pressed and crushed in this manner.

During this step, the convex portions 82, which are stacked on the end of the first resin composite member 72, flow in the directions of the arrows shown in FIG. 12. Therefore, the non-overlapping space 96 is filled with the base material and the discontinuous fibers 22, and differences in level of the convex portion 82, which is overlapped with the end, are eliminated. Thus, the connection is formed as a flat surface part. In the case that the second resin composite member 74 is expanded during this step, the ends of the second resin composite member 74 are stopped by the stoppers 94a, 94b. It will be understood that the convex portions 82, which are stacked on the end of the third resin composite member 76, also flow in the same manner.

The connections are cooled and hardened in order to produce the resin composite structure 70. As shown in FIG. 10, the resin composite structure 70 contains the long first resin composite member 72, the short second resin composite member 74, and the long third resin composite member 76, which are arranged and bonded together integrally in this order in the longitudinal direction. Uneven portions and clear boundaries are not formed in the connection between the first resin composite member 72 and the second resin composite member 74, or in the connection between the second resin composite member 74 and the third resin composite member 76. Thus, the resin composite structure 70 has a flat surface.

In the second embodiment, similar to the case of the first embodiment, the base material and the discontinuous fibers 22 flow in the above-described manner in the overlapping portions (see FIG. 12). Therefore, the discontinuous fibers 22 are oriented randomly in the connections, and thus, the discontinuous fibers 22 are intertwined with each other. Consequently, the connections exhibit excellent strength and stiffness.

The present invention is not particularly limited to the first and second embodiments, which have been described above. Various changes and modifications may be made to the embodiments without departing from the scope of the invention.

For example, although according to the first embodiment (see FIG. 6), the areas S1 and S2 satisfy the condition of S2/S1=1, the ratio S2/S1 may lie within the range of $0.75 \leq S2/S1 \leq 2$. When the ratio S2/S1 is at least 0.75 but less than 1, the connection can exhibit sufficient strength, and can be thinner than the first part 18 and the second part 20. Thus, the connection can be formed as a depression. On the other hand, when the ratio S2/S1 is more than 1 but at most 2, the strength of the connection can be further improved, and the connection can be formed as a protrusion. Such a depression or protrusion may be utilized in a design shape.

It is to be understood that, although according to the second embodiment (see FIG. 12), the areas S3 and S4 satisfy the condition of S4/S3=1, the ratio S4/S3 may lie within the range of $0.75 \leq S4/S3 \leq 2$.

In the second embodiment, the step of integrally bonding the first resin composite member 72 and the second resin composite member 74, and the step of integrally bonding the second resin composite member 74 and the third resin composite member 76 are performed simultaneously. For example, for a case in which the first resin composite member 72, the second resin composite member 74, and the third resin composite member 76 have large sizes and thus it is difficult to carry out placement of all of the linking parts in the molding unit, the step of integrally bonding the second resin composite member 74 and the third resin composite member 76 may be performed after the step of integrally bonding the first resin composite member 72 and the second resin composite member 74. In other words, if necessary, these steps may be performed separately.

The wavy parts 28a to 28d, 78a, 78b may be formed during the process of molding the resin composite members 12, 14, 74.

In the present invention, the wavy parts 28a to 28d, 78a, 78b are not particularly limited, as long as the linking part, which is overlapped with the opposite material, and the non-overlapping space, which is not overlapped with the opposite material, can be formed.

Figure 13:
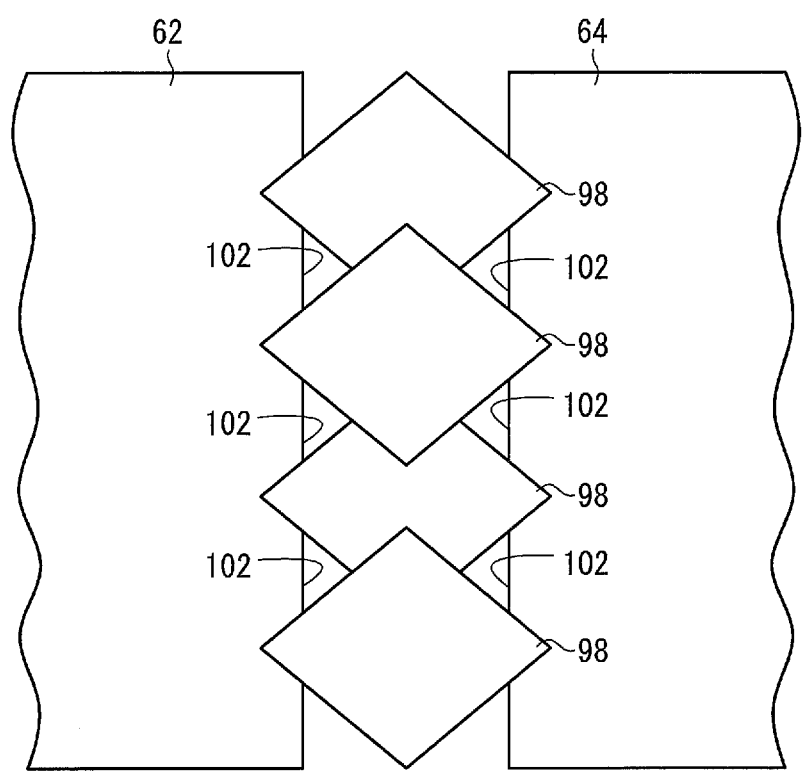
FIG. 13 is a schematic top plan view of a first resin composite member and a second resin composite member, which are linked by (overlapped with) a linking part containing additional resin composite members.
Figure 14:
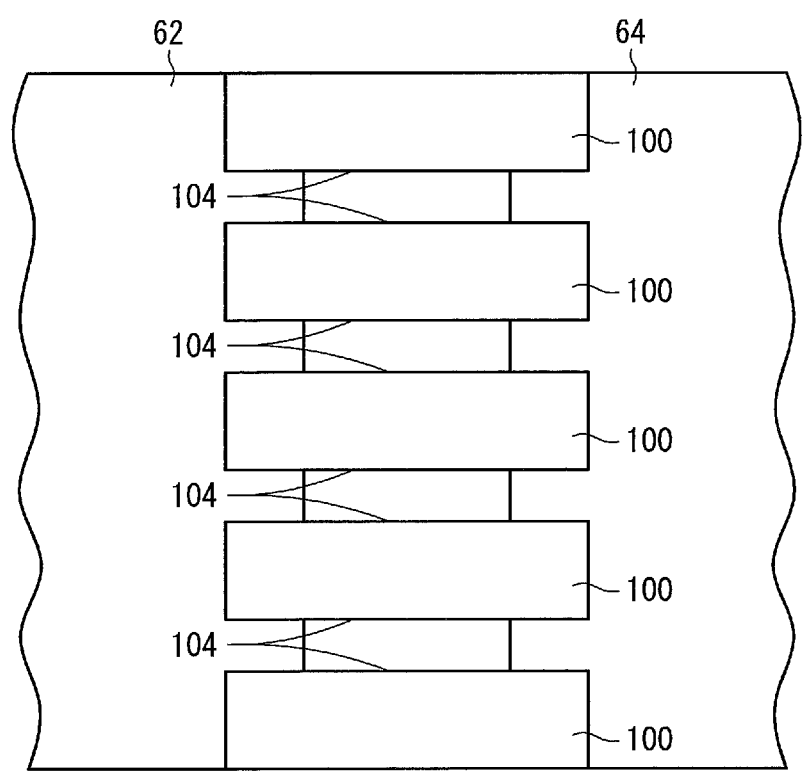
FIG. 14 is a schematic top plan view of the first resin composite member and the second resin composite member, which are linked by (overlapped with) another linking part containing additional resin composite members differing in shape from those shown in FIG. 13.

Although according to the first and second embodiments, the wavy parts 28a to 28d, 78a, 78b having convex portions 26, 82 are formed as linking parts on the resin composite members 12, 14, 74, additional resin composite members 98, 100 may be used as linking parts, as shown in FIGS. 13 and 14.

In the embodiment shown in FIG. 13, plural additional resin composite members 98, which are substantially rhombic in shape, are stacked on the first resin composite member 62 and the second resin composite member 64 having a simple flat plate-like shape. Thus, the first resin composite member 62 and the second resin composite member 64 are linked by the resin composite members 98, and non-overlapping spaces 102 are formed between the first resin composite member 62 and the resin composite members 98, as well as between the resin composite members 98 and the second resin composite member 64. In this case, corners of the adjacent resin composite members 98, 98 may be overlapped with each other.

In the embodiment shown in FIG. 14, the first resin composite member 62 and the second resin composite member 64 are linked by the additional resin composite members 100, which are substantially rectangular in shape, and non-overlapping spaces 104 are formed between the separate resin composite members 100, 100.

In the embodiments of FIGS. 13 and 14, as in the case of the first and second embodiments, the base thermoplastic resin and the discontinuous fibers 22 in the resin composite members 98, 100 undergo movement, whereby the non-overlapping spaces 102, 104 are filled with the base thermoplastic resin and the discontinuous fibers 22. Consequently, the discontinuous fibers 22 are oriented randomly in the connections.

While the invention has been particularly shown and described with reference to preferred embodiments, it will be understood that variations and modifications can be effected thereto by those skilled in the art without departing from the scope of the invention as defined by the appended claims.

What is claimed is:

1. A method for producing a resin composite structure by bonding a first resin composite member and a second resin composite member both containing discontinuous fibers, comprising:
   an overlapping step of forming a linking part and a non-overlapping space, which is a portion other than the linking part, between an end of the first resin composite member and an end of the second resin composite member, the ends being linked by the linking part;
   a bonding step of applying a load to the linking part and the ends, so as to fill the non-overlapping space and integrally bond the linking part and the ends, thereby producing the resin composite structure having a connection, wherein the discontinuous fibers are oriented randomly in the connection; and a heating step of thermally softening at least the linking part, before the overlapping step, after the overlapping step, or during the bonding step.

2. The method according to claim 1, wherein the linking part is formed on at least one of the first resin composite member and the second resin composite member.

3. The method according to claim 1, wherein at least one additional resin composite member containing discontinuous fibers is used as the linking part, and the linking part is overlapped with both of the first resin composite member and the second resin composite member that are separated from each other, such that the first resin composite member and the second resin composite member are linked by the linking part.

4. The method according to claim 1, wherein the ratio of the area of an overlapping portion in the linking part to the area of the non-overlapping space is 0.75 to 2.

5. The method according to claim 4, wherein the ratio of the area of the overlapping portion in the linking part to the area of the non-overlapping space is 1.

6. The method according to claim 1, further comprising:

a second overlapping step of forming a second linking part and a second non-overlapping space, which is a portion other than the second linking part, between an end of the second resin composite member and an end of a third resin composite member containing the discontinuous fibers, the ends being linked by the second linking part;

a second bonding step of applying a load to the second linking part and to the ends of the second resin composite member and the third resin composite member, so as to fill the second non-overlapping space and integrally bond the second linking part and the ends of the second resin composite member and the third resin composite member, thereby producing the resin composite structure having a second connection, wherein the discontinuous fibers are oriented randomly in the second connection; and a second heating step of thermally softening at least the second linking part, before the second overlapping step, after the second overlapping step, or during the second bonding step.

7. The method according to claim 6, wherein the bonding step and the second bonding step are performed simultaneously.

8. The method according to claim 1, wherein the bonding step produces the resin composite structure in a flat plate shape with a flat surface.

9. The method according to claim 1, wherein during the bonding step the load applied to the linking part and the ends causes base material and the discontinuous fibers of the first resin composite member and second resin composite member to flow into the non-overlapping space and the discontinuous fibers flowed into the non-overlapping space to become randomly intertwined with each other.

10. The method according to claim 1, further comprising, prior to the overlapping step, a cutting step of cutting the end of at least one of the first resin composite member and the second resin composite member to form a wavy part having alternating convex portions and concave portions, wherein, in the overlapping step, the ends of the first resin composite member and the second resin composite member are brought together so that the convex portions overlap with an opposed one of the first resin composite member and the second resin composite member, and the concave portions do not overlap with an opposed one of the first resin composite member and the second resin composite member, so that the non-overlapping space is defined within the concave portions.

11. The method according to claim 10, wherein during the bonding step the load applied to the linking part and the ends causes base material and the discontinuous fibers of the first resin composite member and second resin composite member to flow into the non-overlapping space and the discontinuous fibers flowed into the non-overlapping space to become randomly intertwined with each other.

12. The method according to claim 1, further comprising, prior to the overlapping step, a cutting step of cutting the end of the first resin composite member and the second resin composite member to form a wavy part in each of the first resin composite member and the second resin composite member, each wavy part having alternating convex portions and concave portions, the convex portions and concave portions of the wavy parts being in same phase, wherein, in the overlapping step, the ends of the first resin composite member and the second resin composite member are brought together so that the convex portions of the first resin composite member and the second resin composite member overlap each other, and the concave portions of the first resin composite member and the second resin composite member do not overlap each other, so that the non-overlapping space is defined within the concave portions.

13. The method according to claim 12, wherein during the bonding step the load applied to the linking part and the ends causes base material and the discontinuous fibers of the first resin composite member and second resin composite member to flow into the non-overlapping space and the discontinuous fibers flowed into the non-overlapping space to become randomly intertwined with each other.

* * * * *